United States Patent
Hoehe et al.

(10) Patent No.: US 11,791,508 B2
(45) Date of Patent: Oct. 17, 2023

(54) PLATE-LIKE FLUID CONTAINER

(71) Applicant: Reinz-Dichtungs-GmbH, Neu-Ulm (DE)

(72) Inventors: Kurt Hoehe, Langenau (DE); Christian Luksch, Illertissen (DE); Felix Senf, Ulm (DE)

(73) Assignee: Reinz-Dichtungs-GmbH, Neu Ulm (DE)

( * ) Notice: Subject to any disclaimer, the term of this patent is extended or adjusted under 35 U.S.C. 154(b) by 408 days.

(21) Appl. No.: 16/927,822

(22) Filed: Jul. 13, 2020

(65) Prior Publication Data

US 2021/0021006 A1 Jan. 21, 2021

(30) Foreign Application Priority Data

Jul. 15, 2019 (DE) .......................... 202019103895.0

(51) Int. Cl.
*H01M 10/6554* (2014.01)
*H01M 10/613* (2014.01)
*H01M 10/647* (2014.01)
*H01M 10/6556* (2014.01)
*B23K 26/22* (2006.01)

(52) U.S. Cl.
CPC ......... *H01M 10/6554* (2015.04); *B23K 26/22* (2013.01); *H01M 10/613* (2015.04); *H01M 10/647* (2015.04); *H01M 10/6556* (2015.04)

(58) Field of Classification Search
CPC ........... H01M 10/6554; H01M 10/613; H01M 10/647; H01M 10/6556; B23K 26/22; F28D 1/035; F28D 2021/0043; F28D 9/00; F28F 3/12; F28F 3/046; F28F 3/10; F28F 9/26; F28F 2275/06; Y02E 60/10
See application file for complete search history.

(56) References Cited

U.S. PATENT DOCUMENTS

| 4,688,631 A * | 8/1987 | Peze ..................... F28D 9/0037 29/890.039 |
| 2006/0054664 A1 | 3/2006 | Strobel et al. |
| 2019/0366877 A1 * | 12/2019 | Blersch ................ B23K 1/0012 |

FOREIGN PATENT DOCUMENTS

| DE | 10221951 A1 | 12/2003 |
| DE | 102017202552 A1 | 8/2018 |

* cited by examiner

*Primary Examiner* — Muhammad S Siddiquee
(74) *Attorney, Agent, or Firm* — McCoy Russell LLP

(57) ABSTRACT

A plate-like fluid container for conducting a fluid, usable for regulating the temperature of an electrochemical system such as batteries, battery stacks and the like, and, in particular traction batteries, having a metallic baseplate and a metallic channel plate adjacent to the baseplate. The channel plate includes at least one channel for conducting the fluid, and the baseplate for thermal contact with the electrochemical system that includes at least one indentation directed toward the channel plate where within the baseplate is welded to the channel plate, with the weld seam on the side of the baseplate facing away from the channel plate.

16 Claims, 6 Drawing Sheets

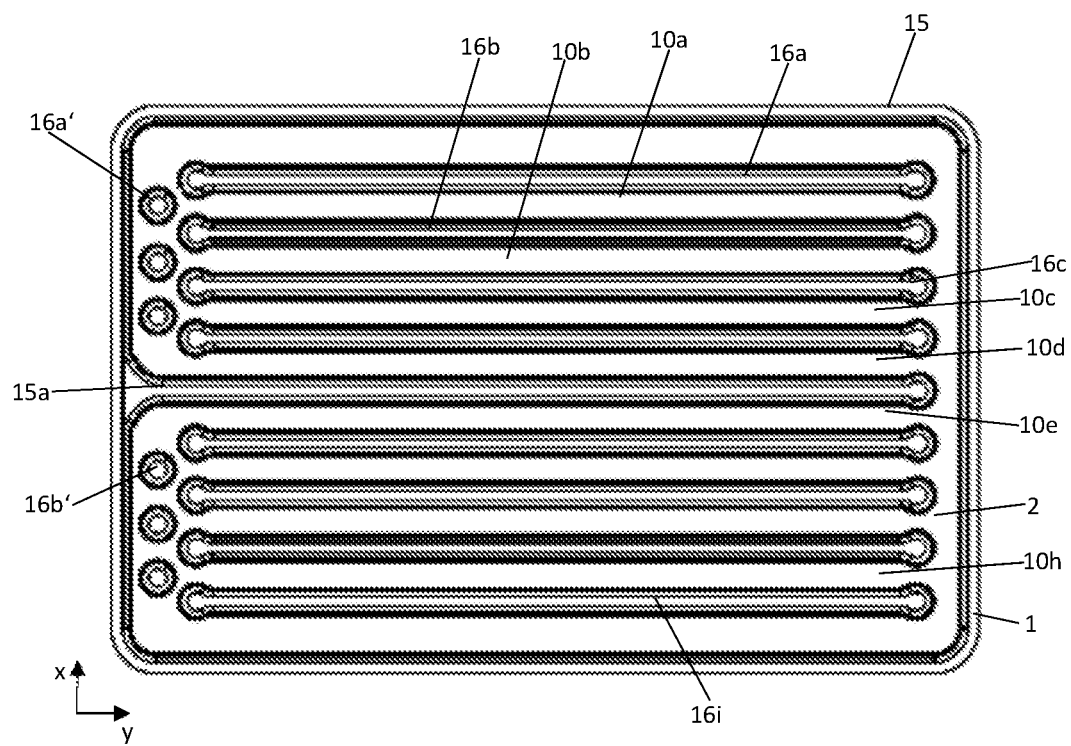
Fig. 2
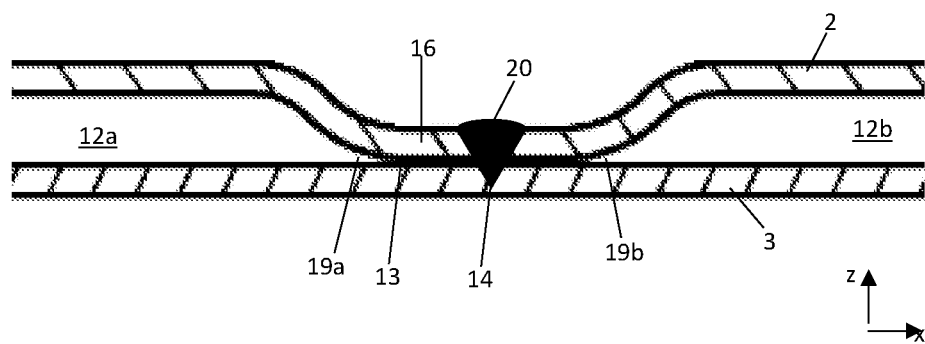
Fig. 3 – Prior art

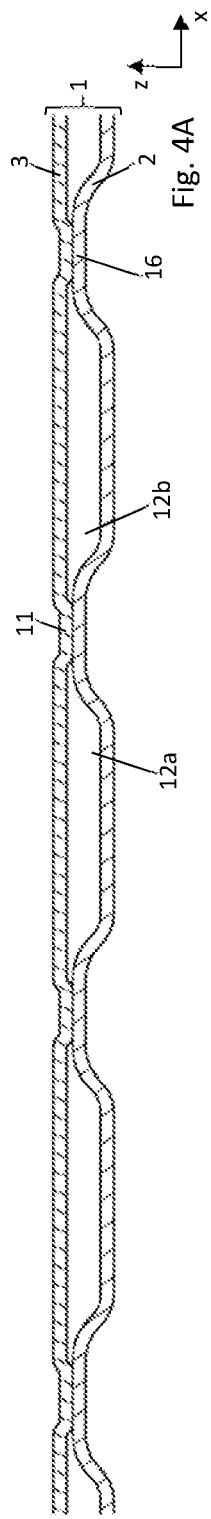
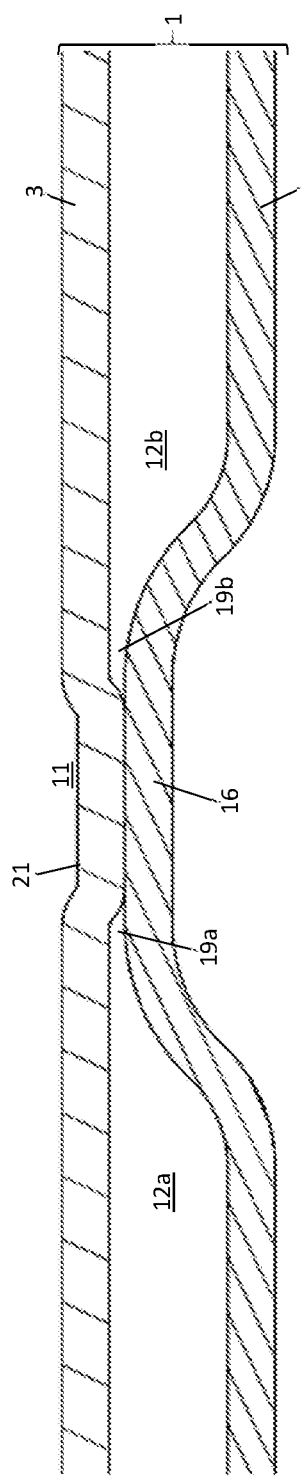
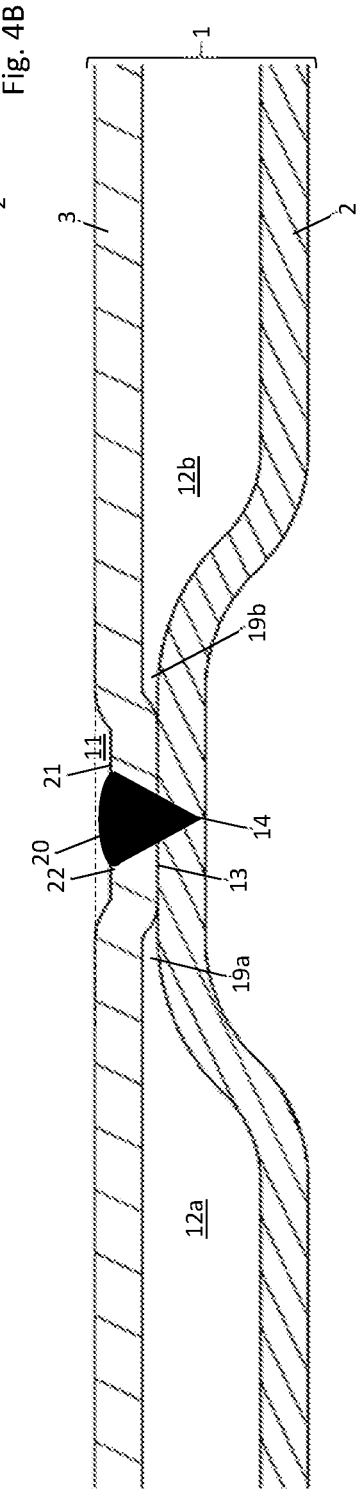

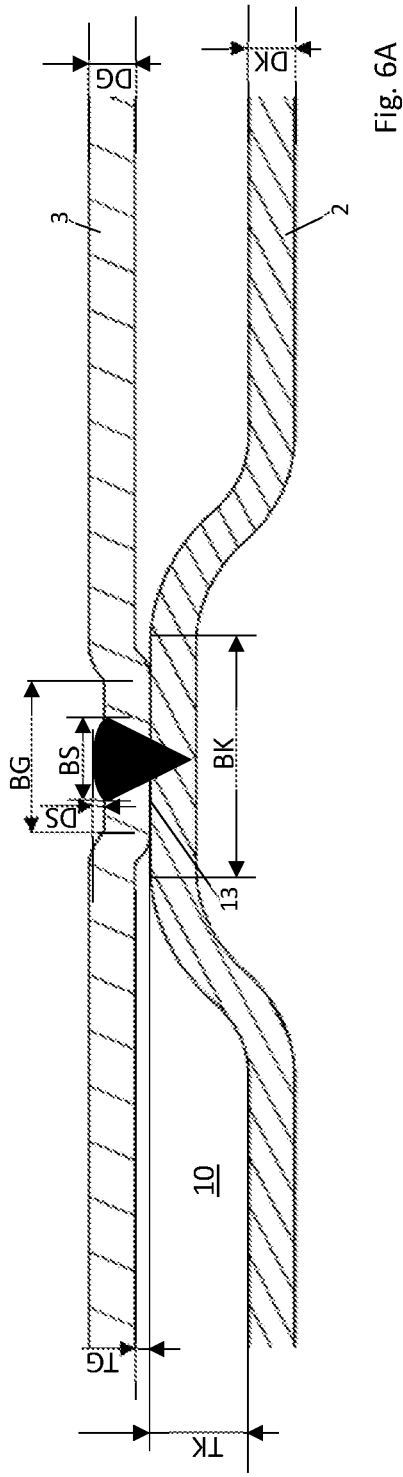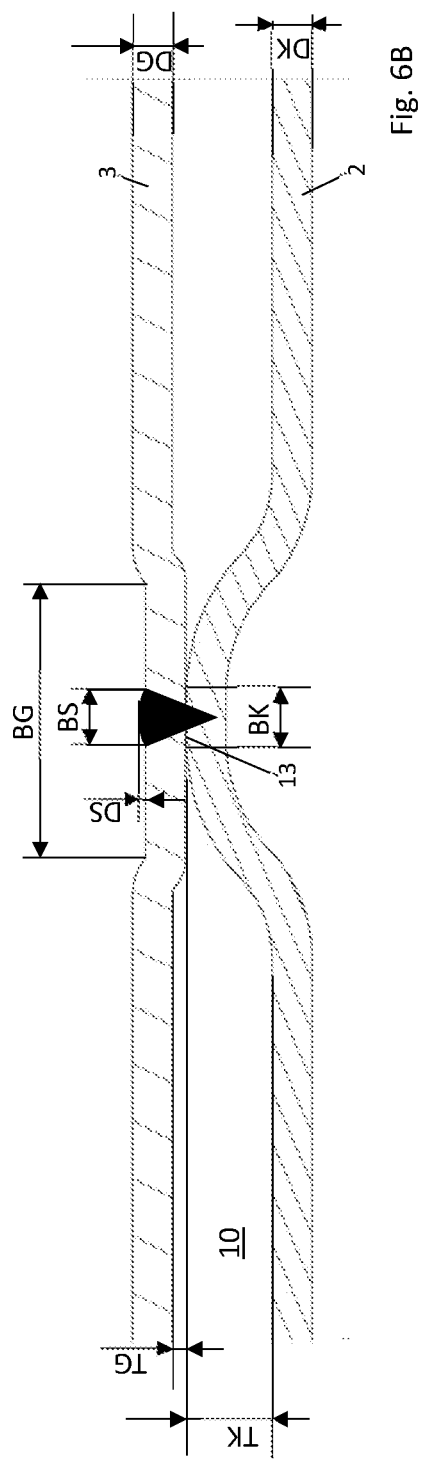

PLATE-LIKE FLUID CONTAINER

CROSS REFERENCE TO RELATED APPLICATION

The present application claims priority to German Utility Model Application No. 202019103895.0, entitled "PLATTENARTIGER FLUIDBEHALTER", and filed on Jul. 15, 2019. The entire contents of the above-listed application is hereby incorporated by reference for all purposes.

FIELD

The present invention relates to a plate-like fluid container for conducting a fluid.

BACKGROUND AND SUMMARY

Fluid containers for conducting a fluid are used in particular as temperature regulation plates. With such temperature regulation plates, for example electrochemical systems such as batteries, battery stacks and the like, in particular traction batteries, are temperature-regulated, i.e. are heated or cooled, depending on the respective environmental conditions and the demands made on the system. The term "battery" in this document refers to primary and secondary batteries.

Such fluid containers, in particular temperature regulation plates, are conventionally constructed from two plates or flat layers which are connected together and enclose fluid channels between them. In this case, usually a metal, in particular aluminium, is used as a material for the plates.

A first plate usually has depressions, so that cavities are produced between it and the adjacent layer, in which cavities the temperature regulation fluid, for example water, can flow. The first layer is therefore usually also referred to as a "channel plate".

The second plate or layer is usually formed largely, virtually or completely smooth, and is therefore usually referred to as a "smooth layer". It has, at least in those regions in which it rests on the system which is to be temperature-regulated, no or only slight profiling.

The smooth layer and the channel plate are for example welded together, in particular linearly welded together. The weld seam in this case penetrates the entire thickness of the layer from that outside of which the welding process takes place, and extends at least in portions into the other layer. The weld seam in this case bears on the first-mentioned layer, on the outside which faces away from the other layer, and protrudes above it. There is no protrusion of the weld seam on the surface of the two layers opposite to the side from which the laser beam is directed to the pair of plates. The smooth layer, on the side facing the system which is to be temperature-regulated, must not have any elevations in the direction of the system which is to be temperature-regulated which permit only a small contact area with the system which is to be temperature-regulated, for example because they only have a small proportion of the surface of the smooth layer, for example less than 20%, and/or are arranged in a highly scattered manner. The protruding deposit due to the weld seam would possibly prevent such good contact between the smooth layer and the system which is to be temperature-regulated. In order therefore to ensure good, flat contact with the system which is to be temperature-regulated, the welding of the smooth layer and of the channel plate usually takes place from the side of the channel plate, thus the welding beam enters from this side.

The welding takes place in this case in particular in the lands between the channels, so that the weld seam is embedded between the channels and does not overall protrude above the channel plate. The thickening of the channel plate caused by the weld seam is therefore unproblematic.

One further disadvantage of this construction of the fluid container with a smooth layer and a channel plate consists in that the depth of the channels has to be produced completely out of the channel plate. The embossing depths of the channel plates are therefore very great.

When welding the channel plate and smooth layer from the channel plate, in the event of short-term excessive energy input, melting of the smooth layer on its surface facing away from the channel plate may definitely occur. The resulting thickening on that surface of the smooth layer or of the fluid container which points towards the object which is to be temperature-regulated therefore entails the risk of an impermissibly small contact in the installed state of the fluid container.

Alternatively, there are also fluid containers in which the channels are produced jointly both from the first layer and from the second layer, with the depressions which are adjacent to each other and face away from each other, which form a common channel, being approximately of the same depth in both layers. This has the advantage that the embossing depths in both layers are approximately of the same size and particularly great embossing depths in only one layer with all the associated manufacturing-related difficulties are avoided. However, it has the disadvantage that the embossments in the layer that faces the object to be temperature-regulated have such a large distance to this object that these areas cannot contribute to the temperature-regulations as the gap is too wide as to be effectively bridged with respect to temperature-guidance.

This then is the starting point of the present invention, the object of which is to provide a fluid container in plate-like form for conducting a fluid in which good contact with a system to be temperature-regulated is ensured and which is simple to produce.

This object is achieved by the fluid container according to the described embodiments.

Using the above concepts, the plate-like fluid container according to the invention has a metallic channel plate as the first plate and a metallic baseplate as the second plate. The channel plate has channel-like depressions which are directed away from the adjacent second layer and which form free spaces between the first plate and the channel plate as channels for conducting the fluid.

In contrast to the prior art, the baseplate in the region in which it contacts the system to be temperature-regulated is now no longer completely smooth. Rather, it has indentations which face towards the channel plate. In other words, the channel-like depressions of the channel plate and the indentations of the baseplate are directed in the same direction.

The indentations of the baseplate in this case are arranged such that the baseplate with its indentations lies on the lands present between the channel-like depressions of the channel plate. In these regions, the baseplate can then be welded to the channel plate.

According to the invention, the plate-like fluid container according to the invention now makes it possible to weld from the side of the baseplate, it—as also in the prior art—being inevitable that a weld seam will form which protrudes above the layer thickness of the baseplate in regions of the baseplate which are directly adjacent to the weld seam on the surface from which the welding beam enters.

The weld seam runs according to the invention in the indentations of the baseplate, the indentations being configured such that they are deeper than the protruding amount of the weld seam. In other words, the indentations in the baseplate are configured so that the weld seam does not protrude above the baseplate in the regions adjacent to the indentations. To this end, it is however sufficient to provide relatively slight indentations which additionally can be kept very narrow and therefore only slightly reduce the contact area between the baseplate and the system to be temperature-regulated.

With the fluid container according to the invention, it is possible to weld the baseplate and the channel plate together from the side of the baseplate. Since the indentations in the baseplate in the base of which the weld seam runs are relatively narrow and relatively flat, compared with the channel-like depressions in the channel plate, and compared to plates in fluid containers with symmetric share of the channel depth between the plates, the welding mask which has to be placed on the baseplate for this can be configured simply. In particular, owing to the low depth and the narrow width of the indentations, it is not necessary for the welding mask to extend into the indentations in the baseplate. As a consequence, the welding mask can be flat and the production of the structures relevant for the production of the welding geometry can be done using laser cutting, no time-consuming milling is required.

Advantageously, one or more regions of the baseplate of the plate-like fluid container in which no indentations are present is/are arranged spaced apart, from at least one of the channel-like depressions of the channel plate perpendicularly to the layer plane of the baseplate, and adjacent to each other: they thus, together with the associated channel-like depressions, span the fluid channels.

Furthermore, it is advantageous if the baseplate in addition to the indentation according to the invention has, in circumambient manner along its outer edge, a circumambient outer indentation, advantageously in a closed loop, directed towards the channel plate and lying on the channel plate, and optionally the channel plate has an offset, with a weld seam running in circumambient manner around the outer edge in the region in which this outer indentation and this offset are in contact, and thus sealing off the plate-like fluid container towards the outside. At the same time, the distance of the weld seam from the outer edge may alter over its course. This outer indentation may otherwise in every individual respect be configured like the indentation according to the invention in the baseplate described above.

As previously described, the indentations of the baseplate differ from the lands remaining between the channel-like depressions of the channel plate. To this end, in one, several or all portions of the indentations of the baseplate in which the baseplate has a weld seam which protrudes on the outside, at least one of the following ratios applies for the thickness DK of the channel plate, the depth TG of the indentation of the baseplate and the depth TK of the channel-like depressions of the channel plate: a) 0.1 mm≤TG≤0.75 mm, advantageously 0.1 mm≤TG≤0.5 mm, and/or b) 1 DK≤TK≤5 DK, and/or c) 0.6 mm≤TK≤15 mm. Given such dimensions, the indentations are sufficiently deep to house the thickening of the baseplate due to the weld seam, thus the protruding deposit, completely in the indentation. The depth TK of the channel-like depressions of the channel plate is considerably larger than the depth TG of the indentation of the baseplate.

Furthermore, it is advantageous if in one, several or all portions of the indentations in which the baseplate has a weld seam which protrudes on the outside and in which that surface of the baseplate which is located opposite the base of the indentation lies on a portion of the channel plate between two adjacent channel-like depressions of the channel plate, the following applies for the width BS of the weld seam on the surface of the baseplate which faces away from the channel plate, the width BK of the portion between the channel-like depressions of the channel plate and the width BG of the base of the indentation of the baseplate:
a) 0.5 mm≤BS≤3 mm and/or b) 1 mm≤BG≤6 mm, and/or c) BS≤BK≤3 BG.

Both the baseplate and the channel plate of the plate-like fluid container advantageously consist of a metal sheet with a thickness DG of the baseplate of 0.3 mm≤DG≤3 mm or a thickness DK of the channel plate of 0.3 mm≤DK≤3 mm. In this case, the baseplate and the channel plate may have sheet thicknesses which are identical or different from each other. Preferably at least one of the plates, i.e. the baseplate or the channel plate, consists of an aluminium alloy. For example, the channel plate may also be formed from high-grade steel. Particularly frequently, however, aluminium alloys are used for both plates: in this case identical or different alloys may be used.

For connecting the baseplate and the channel plate in the regions between the channels, it is advantageous if one, several or all of the weld seams which run in one of the indentations has or have a length $L_{SN}$, where $L_{SN}$≥100 mm. In this case, it is particularly advantageous if one, several or all of the weld seams which run in one of the indentations run or runs, over a length $L_1$, rectilinearly or substantially rectilinearly, where $L_1$≥20 mm, preferably where $L_1$≥50 mm.

Additionally or alternatively to rectilinear weld seams, weld seams of which one, several or all run in a closed loop, with the course of the weld seam deviating from a circular form, may also be present. These may in this case be in particular weldings of local contact points between the baseplate and channel plate. The shapings of the baseplate and channel plate which form the contact points may in this case likewise be different from a circular form, for example be oval or kidney-shaped.

In many temperature regulation plates for electrochemical systems such as traction batteries, one inlet socket and one outlet socket, respectively, for inlet and outlet of the temperature regulation fluid are welded onto the baseplate.

When producing a conventional connection between the channel plate and baseplate, therefore three steps are necessary, namely firstly welding of the baseplate and the channel plate from the side of the channel plate, then turning the fluid container, and lastly welding the two sockets onto the baseplate from the side of the baseplate. With the fluid container according to the invention, the welding of the baseplate to the channel plate and the welding-on of the inlet socket and outlet socket can take place from the same side and can therefore take place in one step without turning of the fluid container in between.

In this case it is advantageous if the inlet socket is welded to the baseplate in circumambient manner in a closed loop. Likewise, it is advantageous if the outlet socket is welded to the baseplate in circumambient manner in a closed loop.

The fluid container according to the invention therefore has a large number of advantages. Due to the altered connection technology, it has in particular an increased number of possible configurations for the connection technology itself, the fluid guidance and the component rigidity with a lowered susceptibility to error of the method. For the method itself, furthermore advantages are yielded in the production of the welding mask, in the production of the fluid container, in particular when additionally attaching sockets to the baseplate.

In particular, due to the reversal of the welding direction, now from the baseplate, the clamping of the individual layers of the plate-like fluid container with the welding mask can be simplified and improved, so that the welding quality also improves.

Owing to the slight profiling by indentation of the second plate, here the baseplate (referred to in the prior art as "smooth layer"), in the region of the weld seams, additionally the rigidity of the plate is increased, and given suitable guidance of the indentations the effective channel depth between the baseplate and the channel plate is also increased somewhat. Tensile tests with otherwise identical plates for an embossing depth of the indentations of 0.3 mm and a sheet thickness of 0.6 mm have yielded a 1.73% greater rigidity relative to the maximum tensile force of a baseplate compared with a smooth layer.

The indentations in the baseplate for receiving the weld seam may be made considerably flatter and narrower than channel-like depressions for forming channels, in which the weld seam is additionally received in lands between the adjacent channels. Furthermore, thus also the regions tapering between the channel plate and baseplate which adjoin the contact area of the channel plate and baseplate (in cross-section through the channel plate and the baseplate) are considerably reduced. As a result, dead spaces which cannot be used for the temperature regulation fluid to flow through and therefore are not cooled effectively are also reduced. For the fluid containers according to the invention, the further advantage therefore results that a larger area of the baseplate is temperature-regulated by the temperature regulation fluid, as a result of which the temperature regulation performance of the entire fluid container is improved.

In summary, it can be established that, compared with a conventional temperature regulation plate with a baseplate configured without any profiling in the region in which it rests on a system to be temperature-regulated, the baseplate now has indentations which are suitable in each case for receiving a weld seam without the weld seam protruding over the surface of the base plate. These indentations may be made less deep than the channel depressions in the channel plate or less high than the height of the corresponding lands between channel depressions in the channel plate. The width may also be made different.

Compared with fluid containers in which both the baseplate and channel plate are provided with complementary channel-like depressions which in each case jointly form a fluid channel, the indentations of the baseplate in the fluid container according to the invention are considerably flatter (less deep), since they substantially serve merely to receive the weld seam. The regions between adjacent indentations, if located opposite a channel-like depression in the channel plate, together with this channel-like depression enlarge the fluid channel constructed therebetween merely slightly in its depth. Insofar as the regions between adjacent indentations are wider than the width of a channel-like depression located opposite, they however widen the edge regions in the flanks of the channel-like depression and increase the depth of these edge regions when viewing the fluid container vertically. These edge regions can thus make a positive contribution to the temperature regulation action. Compared to the prior art with the channel plate approaching the smooth base plate, the channel plate and the base plate with indentations here approach each other. It is the base plate that approaches the channel plate in order to rest on the latter. Compared to the prior art with plates with essentially symmetrically distribution of the channel depth where the plates approach each other essentially symmetrically, thus without lateral offset, here the two plates approach each other in two steps with curves.

With the present invention, it is in particular possible to provide a fluid container in a plate-like form for conducting a fluid, with which good contact with a system to be temperature-regulated is ensured and which is simple to produce. To this end, the baseplate of the plate-like fluid container has at least one indentation directed in the direction of the channel plate of the plate-like fluid container, with the baseplate lying on the channel plate in the base of the indentation and being welded to the channel plate, forming at least one weld seam running in the base of the indentation. The weld seam in this case on that side of the baseplate which faces away from the channel plate protrudes above regions of the baseplate which are directly adjacent to the weld seam, but avoids a thickening of the baseplate by the weld seam, since the indentation is of such a depth that the baseplate outside the indentation protrudes above the weld seam running in the indentation.

Below, steps of a method for producing the plate-like fluid container described above are described.

Such a method for producing the metallic plate described above may according to a first aspect comprise e.g. at least the following steps: producing the baseplate and the channel plate and subsequent connecting of the baseplate to the channel plate, by the baseplate and the channel plate being welded together from the side of the baseplate.

According to a second aspect of the method, the aforementioned method may be supplemented by the following step, which may take place prior to, during or after the connecting of the baseplate to the channel plate: applying an inlet socket and/or an outlet socket to the baseplate, in particular welding-on. This may take place without changing the position of the fluid container, in particular without turning it. It is in particular possible to use a uniform welding mask both for the connecting of the baseplate and channel plate and for the welding-on of the inlet socket and/or outlet socket.

Some examples of fluid containers according to the invention will now be given below. In this case, identical or similar reference numerals designate identical or similar elements.

In the following examples, in each case a large number of compulsory and/or optional features of a fluid container according to the invention are illustrated in each case in a specific, merely exemplified, combination. The present invention however also comprises any combination of individual features of the following examples with each other, in particular also features from various examples with each other.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

FIG. 2 shows a top view of a temperature regulation plate;

FIG. 3 shows a detail of the temperature regulation plate in FIG. 2;

FIG. 4 shows in its sub-figures 4A, 4B and 4C in each case a detail of a cross-section through a fluid container according to the invention;

FIG. 5 in its sub

FIG. 6 in its sub -FIGS. 6A and 6B shows in each case a detail of a cross-section through a fluid container according to the invention with dimensions.

DETAILED DESCRIPTION

Figure 1A:
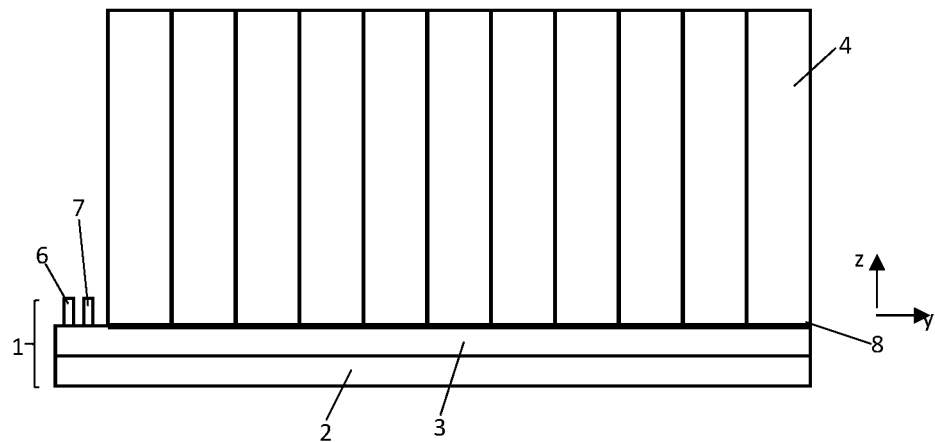
FIG. 1 shows a side view (FIG. 1A) and a top view (FIG. 1B) of a battery system with a temperature regulation plate.

It is to be understood that the invention may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Figure 1B:
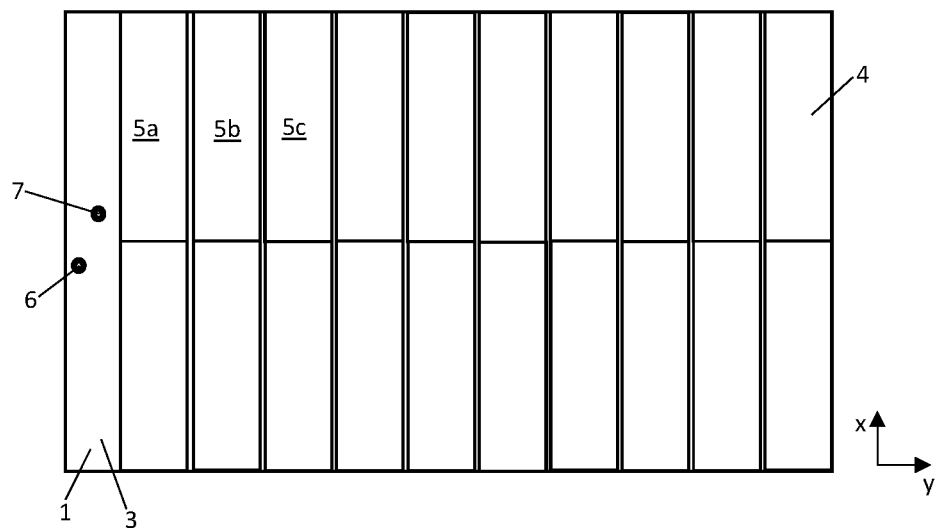

FIG. 1 shows in the sub-FIGS. 1A and 1B a side view (FIG. 1A) and a top view (FIG. 1B) of a temperature regulation module 1 with a battery module 4 and a fluid container 1. The battery module 4 has a series of battery cells 5a, 5b, 5c, . . . and lies on a second plate 3 of the fluid container 1, with an adhesive and/or compensation layer 8 extending between the underside of the battery module 4 and the upper side of the second plate 3. The second plate 3 (in the prior art often referred to as "baseplate") together with a first plate, namely a channel plate 2, forms the core of the fluid container 1, which additionally also has a coolant inlet 6 and a coolant outlet 7, both of which are connected to the second plate 3. During operation, the coolant is then introduced by way of the inlet 6 into channels between the second plate 3 and the channel plate 2, flows through these channels and leaves the fluid container 1 by way of the outlet 7, usually continuously. By way of an adhesive and/or compensation layer 8, the battery module 4 lies flat on the baseplate of the fluid container 1. If a temperature regulation fluid flows through the temperature regulation module 1, the battery module 4 is temperature-regulated, for example cooled. If heating is necessary, heat can also be supplied to the battery module by way of the temperature regulation fluid.

FIG. 2 shows a top view of a channel plate 2 of a fluid container 1. In the channel plate 2 there are embossed channel-shaped depressions 10a, 10b, . . . , between which lands 16a, 16b, 16c, . . . remain in each case. In addition, approximately annular elevations 16a', 16b' are formed in the base of the channel-shaped depressions 10, 10b, . . . , which elevations can for example influence the flow, or alternatively support the channel plate on the baseplate. Furthermore, an offset 15 runs around all channel-like depressions and seals off the channels formed by the channel-like depressions 10a, 10b, 10c, . . . towards the outside from the second plate 3 (baseplate) which is in contact with it. A branching portion of the offset 15 in this case is guided as a middle land 15a between the channel-like depressions 10d and 10e over a major portion of the width of the second plate 3 along the lands 16a, 16b, 16c, . . . as far as the end thereof. The middle land therefore in turn forms a land similarly to the lands 16a, 16b, 16c, . . . .

In FIG. 3, a detail in the region of a land 16 in a channel plate 2 and a smooth layer 3 located opposite is illustrated in cross-section. In the region of this land 16, the two layers 2 and 3 are connected together by means of a weld seam 14. The weld seam is applied from the channel plate 2 and on that surface of the channel plate 2 which points away from the smooth layer 3 forms a thickening 20 relative to those regions of this surface which adjoin the weld seam.

What is disadvantageous with this conventional arrangement is that the weld seam 14 is introduced from the side of the channel layer 2. The lands 16 are relatively wide, since the channels 12a, 12b located between the lands are wide and high. The welding mask should therefore, in order to delimit the region to be welded, extend laterally into the relatively wide land region 16 in order to achieve a surface pressure sufficient for reliable welding.

What is furthermore disadvantageous is that adjacent to the weld seam 14 between the channel plate 2 and the smooth layer 3 in the region directly adjacent to the land 16, namely in the region in which the external radius of that surface of the channel plate 2 which points to the smooth layer 3 is at a maximum, regions 19a, 19b remain in which these two layers are at an only very slight distance, so that these regions cannot be used for conducting the temperature regulation fluid, i.e. the temperature regulation fluid is stationary in these regions 19a, 19b (dead spaces) without significantly contributing to the temperature regulation action.

FIG. 4 shows in sub-FIG. 4A a fluid container according to the invention in cross-section and detail prior to the welding of the two plates 2 and 3. In a departure from the fluid container of the prior art shown previously, the second layer 3 now has indentations which are directed in the direction of the channel plate 2. These indentations, designated by the reference numeral 11, have a low depth which is merely so great (width, depth and length) that the weld seam 14 is received completely in the indentation 11, and the thickening due to a (viewed three-dimensionally) elongate weld seam 14 which runs in the indentation 11 does not protrude above the adjacent, non-indented, regions of the plate 3. To this end, it is generally sufficient in the context of the present invention, regardless of the rest of the configuration of the fluid container 1, if the depth TG is greater than the height DS of the deposit 20 of the weld seam 14. On the other hand, it is generally sufficient in the context of the present invention, regardless of the rest of the configuration of the fluid container 1, if the protruding amount of the depth TG of the indentation 11 above the weld seam 14 towards the outside is at most 70%, advantageously at most 50%, advantageously at most 20%, of the deposit 20 of the weld seam 14 on the baseplate 3, DS, i.e. $(TG-DS)/DS \leq 0.7$, advantageously ≤0.5, advantageously ≤0.2. The values may fluctuate somewhat over the course of the weld seam 14, but the lower and upper limits should also occur at the point at which DS is at a maximum.

The additional indentation 11 furthermore ensures, compared with the prior art, an increased component rigidity of the second plate 3 and hence of the entire plate-like fluid container 1.

FIG. 4B shows a detail around an indentation 11 of the second layer 3 prior to connecting the two plates 2 and 3. In the region of the indentation 11, the second layer 3 lies on the land 16 of the channel plate 2 remaining between the channels 12a and 12b. The contact area 13, which is defined here by the indentation 11 and its width, can be kept smaller than in the prior art, since the indentation 11 merely has to receive the weld seam 14 marked in FIG. 4C. Due to the configuration of the contact in the form of an indentation 11 with a base 21 (i.e. as a groove), it furthermore ensues that the distance between the channel layer 2 and the second plate 3 directly adjacent to the indentation 11, i.e. in the regions 19a and 19b, is greater than in the prior art as illustrated in FIG. 3. It is the second plate 3 that approaches the first plate 2 on both sides of the contact area 13, with the first plate extending in the same plane at least over the entire width in which the second plate 3 is inclined or curved.

FIG. 4C shows the same detail as FIG. 4B, but now once the two layers 2 and 3 have been welded. The weld seam 14 has been introduced from the outside of the layer 3 and therefore protrudes locally with a thickening 20 above those regions 22 of the layer 3 which are directly adjacent to the weld seam. However, the indentation 11 is so deep that the weld seam 14 does not protrude above those regions of the second layer 3 which are adjacent to the indentation 11 and therefore does not hinder the contact between the second layer 3 and an adjacent component which is to be cooled either. If the contact between the second layer 3 and the component 4 to be cooled is produced by way of an adhesive and/or compensation layer 8, the protruding amount 20 resulting due to the weld seam 14 even has the advantage that the volume to be filled by the adhesive and/or compensation layer 8 is less due to this protruding amount 20 than if the entire original indentation 11 had to be filled. This produces improved thermal contact between the second layer 3 and the component 4 to be cooled.

As a whole, compared with the prior art, in addition the volume of the fluid channels 12a and 12b can be enlarged.

Figure 5A:
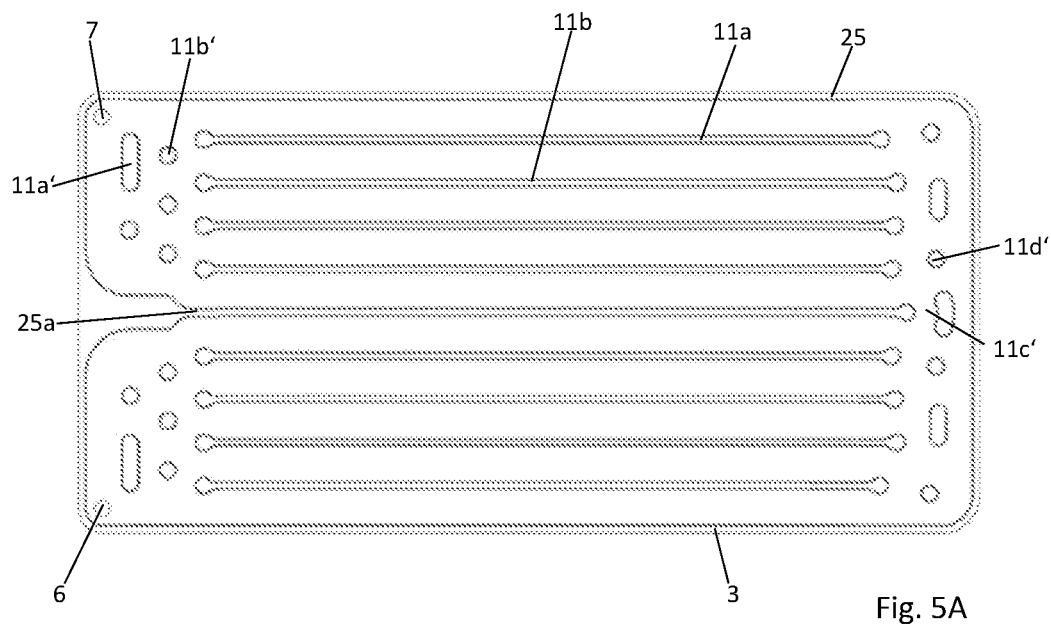
-FIGS. 5A and 5B shows a top view of the two plates of a fluid container according to the invention.
Figure 5B:
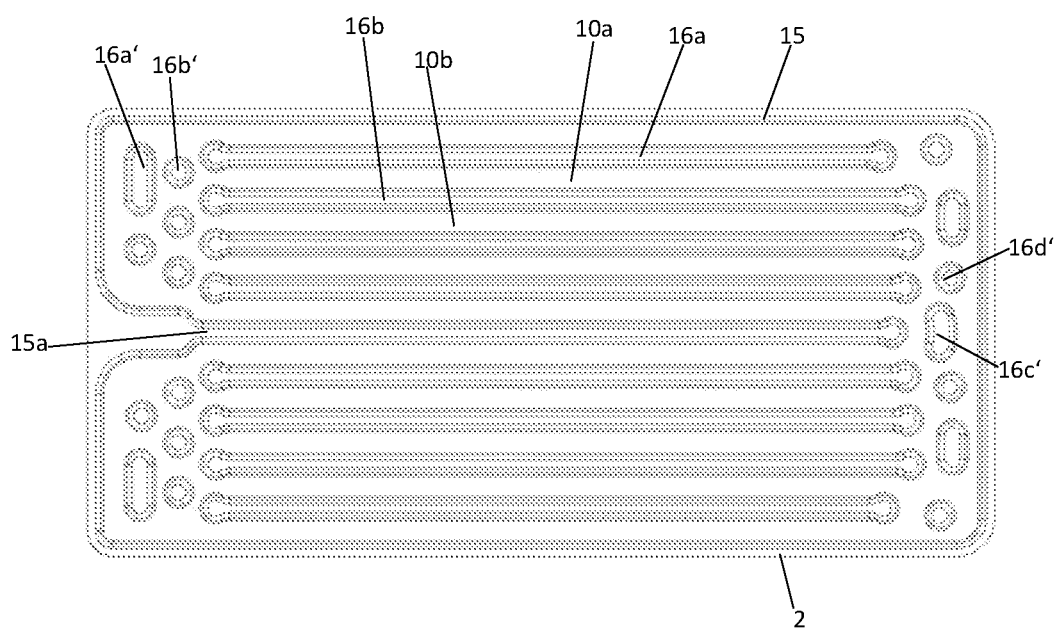

FIG. 5 shows in sub-FIG. 5A a top view of a second layer 3, into which a large number of indentations are embossed, but merely two of which are marked with the reference numerals 11a, 11b. Circumambiently, an outer indentation 25 is present with which the baseplate 3 can be brought to rest on the offset 15 of the channel plate 2 (see FIG. 5B). The outer indentation 25 otherwise is configured like the indentations 11a, 11b, . . . described above. The baseplate 3 here additionally has an inlet 6 and an outlet 7. In addition to linear indentations 11a, 11b, . . . , the baseplate 3 has several more compact indentations 11a', 11b', 11c', 11d', . . . , some of which are kidney-shaped or oval (11a', 11c'), some substantially circular (11b', 11d').

FIG. 5B is a top view of a channel plate 2 similarly to the channel plate illustrated in FIG. 2 for the prior art. Analogously to the structures of the baseplate 3, the channel plate 2 in addition to the linear lands 16a, 16b, . . . has kidney-shaped or oval shapings 16a', 16c' and substantially circular shapings 16b', 16d'. In addition to welding in the region of the linear structures 11a, 16a, 11b, 16b, . . . the plate-like fluid container may thus have welded joins in the region of these structures 11a', 16a', 11b', 16b', 11c', 16c', 11d', 16d'.

The overall embossing depth of the offset 15 and outer indentation 25 at each point of contact 13 advantageously corresponds to the overall embossing depth of the channel-shaped depression 12 and indentation 11.

In FIG. 6, some essential parameters of plate-like fluid containers 1 according to the invention are illustrated in sub-FIGS. 6A and 6B. DG in this case designates the thickness of the baseplate 3, which in the example of embodiment of FIG. 6A is 0.7 mm and in that of FIG. 6B is 0.6 mm. DK designates the thickness of the channel plate 2: here in the two examples of embodiment in each case the same values apply as for DG. DS is the thickening of the weld seam relative to the adjoining regions on the entry surface of the weld beam: in FIG. 6A it is 0.2 mm and in FIG. 6B 0.1 mm. TG indicates the depth of the indentation 11 of the baseplate 3 and TK the depth of the channel-like depressions 10 of the channel plate 2: in this case, the channel-like depressions 10 form that proportion of the channels 12a, 12b which originates from the shaping of the channel plate 2. TG in the example of embodiment of FIG. 6A is 0.3 mm, in that of FIG. 6B, 0.2 mm; TK in the example of embodiment of FIG. 6A is 1.4 mm and in that of FIG. 6B, 1.2 mm. Furthermore, BS designates the width of the weld seam 14 on that surface of the baseplate 3 facing away from the channel plate 2, which in the example of embodiment of FIG. 6A is 1.2 mm and in the example of embodiment of FIG. 6B is 1.0 mm. BK designates the width of the portion between the channel-like depressions of the channel plate 2: in the example of embodiment of FIG. 6A it is 3.2 mm and in that of FIG. 6B, 1.3 mm. Finally, BG designates the width of the base of the indentation 11 of the baseplate 3, which in the example of embodiment of FIG. 6A is 2.0 mm and in that of FIG. 6B, 3.5 mm. Thus in sub-FIG. 6A and also in sub-FIG. 6B in each case: 0.5 mm≤BS≤3 mm, 1 mm≤BG≤6 mm, BS≤BK≤3 BG, 0.1 mm≤TG≤0.75 mm, DK≤TK≤5 DK and 0.6 mm≤TK≤15 mm.

Sub-FIGS. 6A and 6B differ in particular by the ratio of the widths BK and BG: whereas in sub-FIG. 6A BK is somewhat larger than BG, in sub-FIG. 6B BK is only approximately ¼ of BG. It is not illustrated, but likewise possible, to make BG and BK identical or with a minimal deviation from each other.

Optimal utilisation of space may result for BK<BG (see e.g. FIG. 6B), since the space required for the weld seam on the entry side of the weld beam, i.e. the baseplate 3, is greater than at its exit end, i.e. in the channel plate 2. In this case, moreover a particularly large channel volume of the channels 12a, 12b, . . . results, since the channel-like depressions 10 can be made particularly wide. In FIG. 6A, i.e. with BK>BG, on the other hand a particularly low dead volume 19a, 19b results. Compared with FIG. 3, in both cases, i.e. in FIGS. 6A and 6B, a smaller contact area 13 results, which leads to a defined, narrow welding area and thus compared with the prior art to an increased surface pressure on the lands 16.

Both embodiments of FIG. 6 make it possible—compared with plate-like fluid containers of the prior art as illustrated in FIG. 3—to use significantly simpler welding masks, which only have to lie on the non-indented surface of the second plate 3, i.e. to the left of the reference numeral 3b and to the right of the reference numeral 3a. No expensive and time-consuming milling of the welding masks is required, they can be produced in a much easier way using laser cutting.

Figure 7:
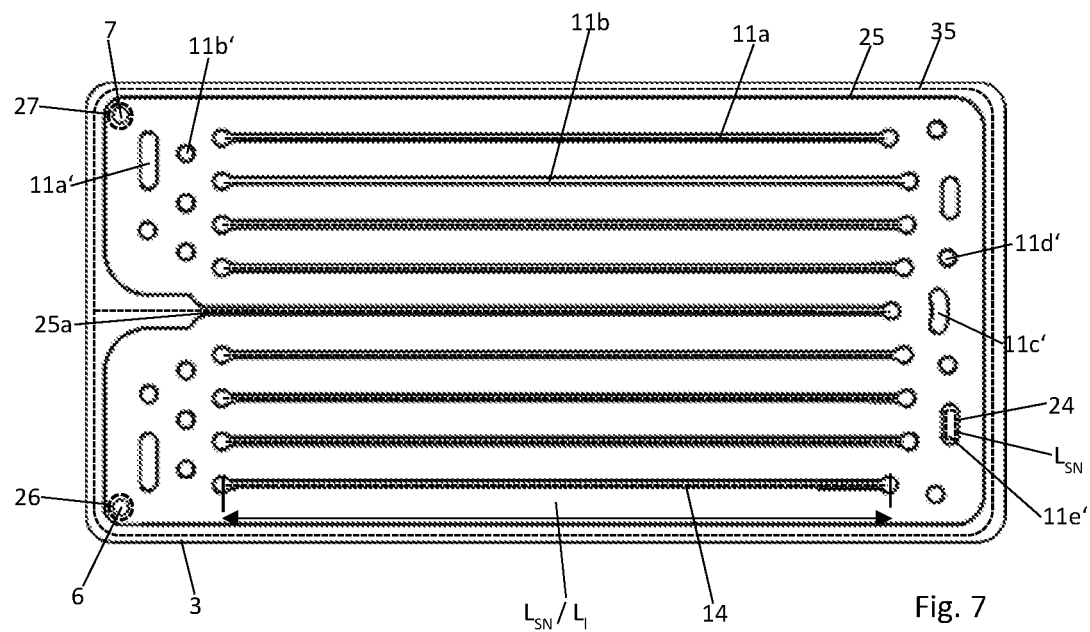
FIG. 7 shows a top view of a plate-like fluid container on the surface of the baseplate.

FIG. 7 shows a top view of a welded plate-like fluid container 1, namely of the baseplate 3 thereof. 14 in this case designates the weld seams running in the indentations: these have a length $L_{SN}$ and run linearly over a length $L_1$. In the present example, they run exclusively linearly, so $L_{SN}=L_1$. On the outer edge, the baseplate 3 and the channel plate 2, which here is covered by the baseplate, are connected in circumambient manner by way of the weld seam 35 in a region in which an outer indentation 25 is in contact with the offset 15 of the channel plate 2. In circumambient manner around the sockets 6, 7, the baseplate 3 is connected to the latter by way of the weld seam 26 or 27 respectively. In addition, a further weld seam 24 is present in the region of an oval indentation 11e'. All the weld seams 14, 35, 26, 27, 24 are represented by broken lines, but these are preferably continuous, fluid-tight welded joins.

FIGS. 1A, 3, 4A, 4B, 4C, 6A, and 6B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The embodiments described herein may include one or more range of values (for example, size, displacement and field strength etc.). A range of values will be understood to include all values within the range, including the values defining the range, and values adjacent to the range that lead to the same or substantially the same outcome as the values immediately adjacent to that value which defines the boundary to the range. For example, a person skilled in the field will understand that a 10% variation in upper or lower limits of a range can be totally appropriate and is encompassed by the disclosure. More particularly, the variation in upper or lower limits of a range will be 5% or as is commonly recognized in the art, whichever is greater.

Throughout this specification relative language such as the words 'about' and 'approximately' may be used. Unless otherwise specified or described, this language seeks to incorporate at least 10% variability to the specified number or range. That variability may be plus 10% or negative 10% of the particular number specified.

The foregoing description is considered as illustrative only of the principles of the invention. Further, since numerous modifications and changes will readily occur to those skilled in the art, it is not desired to limit the invention to the exact construction and processes shown and described herein. Accordingly, all suitable modifications and equivalents may be considered as falling within the scope of the invention as defined by the claims which follow.

The invention claimed is:

1. A plate-like fluid container for conducting a fluid, usable for regulating the temperature of an electrochemical system, the fluid container comprising:
   a metallic baseplate; and
   a metallic channel plate adjacent to the baseplate, wherein the channel plate includes at least one channel for conducting the fluid formed by at least one channel-like depression which is directed away from the baseplate, wherein the baseplate has at least one indentation directed in the direction of the channel plate, wherein in the base of the indentation, on that surface of the baseplate which faces the channel plate and outside the channel-like depressions of the channel plate, the baseplate lies on the channel plate and is welded to the channel plate, forming at least one weld seam running in the base of the indentation, wherein the weld seam on that side of the baseplate which faces away from the channel plate protrudes above regions of the baseplate which are directly adjacent to the weld seam, and wherein the indentation has a depth TG such that the baseplate outside the indentation protrudes above the weld seam running in the indentation and the depth TG is at least 0.1 mm and at most 70% of a height DS of the weld seam in at least one portion of the indentation.

2. The fluid container according to claim 1, wherein one or more regions of the baseplate in which no indentations are present is/are arranged spaced apart, perpendicularly to the layer plane of the baseplate, from at least one of the channel-like depressions of the channel plate and adjacent to each other.

3. The fluid container according to claim 1, wherein the baseplate has, in circumambient manner along its outer edge, an outer indentation, with a weld seam running in this outer indentation in circumambient manner around the outer edge, with optionally the outer indentation like the aforementioned indentations being formed in the baseplate.

4. A plate-like fluid container for conducting a fluid, usable for regulating the temperature of an electrochemical system, the fluid container comprising:
   a metallic baseplate; and
   a metallic channel plate adjacent to the baseplate, wherein the channel plate includes at least one channel for conducting the fluid formed by at least one channel-like depression which is directed away from the baseplate, wherein the baseplate has at least one indentation directed in the direction of the channel plate, wherein in the base of the indentation, on that surface of the baseplate which faces the channel plate and outside the channel-like depressions of the channel plate, the baseplate lies on the channel plate and is welded to the channel plate, forming at least one weld seam running in the base of the indentation, wherein the weld seam on that side of the baseplate which faces away from the channel plate protrudes above regions of the baseplate which are directly adjacent to the weld seam, and wherein the indentation has a depth TG such that the baseplate outside the indentation protrudes above the weld seam running in the indentation and in at least one portion of the indentations, the depth TG of the indentation of the baseplate is:

$$0.1 \text{ mm} \leq TG \leq 0.75 \text{ mm or } 0.1 \text{ mm} \leq TG \leq 0.5 \text{ mm}.$$

5. The fluid container according to claim 1, wherein, in one, several or all portions of the indentations of the baseplate in which the baseplate has a weld seam which protrudes on the outside, the thickness DK of the channel plate and the depth TK of the channel-like depressions of the channel plate are:

$$1 \text{ DK} \leq TK \leq 5 \text{ DK}.$$

6. The fluid container according to claim 1, wherein, in one, several or all portions of the indentations of the baseplate in which the baseplate has a weld seam which protrudes on the outside, the depth TK of the channel-like depressions of the channel plate is:

$$0.6 \text{ mm} \leq TK \leq 15 \text{ mm}.$$

7. The fluid container according to claim 1, wherein, in one, several or all portions of the indentations in which the baseplate has a weld seam which protrudes on the outside and in which that surface of the baseplate which is located opposite the base of the indentation lies on a portion of the channel plate between two adjacent channel-like depressions of the channel plate, the width BS of the weld seam on the surface of the baseplate which faces away from the channel plate is:

$$0.5 \text{ mm} \leq BS \leq 3 \text{ mm}.$$

8. A plate-like fluid container for conducting a fluid, usable for regulating the temperature of an electrochemical system, the fluid container comprising:
a metallic baseplate; and
a metallic channel plate adjacent to the baseplate, wherein the channel plate includes at least one channel for conducting the fluid formed by at least one channel-like depression which is directed away from the baseplate, wherein the baseplate has at least one indentation directed in the direction of the channel plate, wherein in the base of the indentation, on that surface of the baseplate which faces the channel plate and outside the channel-like depressions of the channel plate, the baseplate lies on the channel plate and is welded to the channel plate, forming at least one weld seam running in the base of the indentation, wherein the weld seam on that side of the baseplate which faces away from the channel plate protrudes above regions of the baseplate which are directly adjacent to the weld seam, and wherein the indentation has a depth TG such that the baseplate outside the indentation protrudes above the weld seam running in the indentation and in at least one portion of the indentations in which the baseplate has a weld seam which protrudes on the outside and in which that surface of the baseplate which is located opposite the base of the indentation lies on a portion of the channel plate between two adjacent channel-like depressions of the channel plate, a width BG of the base of the indentation of the baseplate is:

$$1 \text{ mm} \leq BG \leq 6 \text{ mm}.$$

9. The fluid container according to claim 1, wherein, in one, several or all portions of the indentations in which the baseplate has a weld seam which protrudes on the outside and in which that surface of the baseplate which is located opposite the base of the indentation lies on a portion of the channel plate between two adjacent channel-like depressions of the channel plate, the width BS of the weld seam on the surface of the baseplate which faces away from the channel plate, the width BK of the portion between the channel-like depressions of the channel plate, and the width BG of the base of the indentation of the baseplate are:

$$BS \leq BK \leq 3 \text{ BG}.$$

10. The fluid container according to claim 1, wherein the baseplate consists of a metal sheet with a thickness $0.3 \text{ mm} \leq DG \leq 3 \text{ mm}$.

11. The fluid container according to claim 1, wherein the channel plate consists of a metal sheet with a thickness $0.3 \text{ mm} \leq DK \leq 3 \text{ mm}$.

12. The fluid container according to claim 1, having an inlet socket for supplying fluid to the channels and an outlet socket for removing fluid from the channels, the inlet socket and the outlet socket being arranged on the baseplate.

13. The fluid container according to claim 12, wherein the inlet socket and/or the outlet socket is/are welded to the baseplate by way of a weld seam which advantageously runs around the inlet socket, advantageously in a closed loop, and/or runs around the outlet socket, advantageously in a closed loop.

14. The fluid container according to claim 1, wherein one, several or all of the weld seams which run in one of the indentations in each case has or have a length $L_{SN}$, where $L_{SN} \geq 100 \text{ mm}$.

15. The fluid container according to claim 10, wherein one, several or all of the weld seams which run in one of the indentations run(s), in each case over a length $L_1$, where $L_1 \geq 20 \text{ mm}$, preferably where $L_1 \leq 50 \text{ mm}$, rectilinearly or substantially rectilinearly.

16. The fluid container according to claim 1, wherein one, several or all of the weld seams run(s) in each case in a closed loop, with optionally the course of the weld seam deviating from a circular form.

* * * * *